United States Patent Office 3,135,706
Patented June 2, 1964

3,135,706
POLYMERIC EPOXIDES
Edwin J. Vandenberg, Wilmington, Del., assignor to Hercules Powder Company, Wilmington, Del., a corporation of Delaware
No Drawing. Filed May 11, 1959, Ser. No. 812,080
14 Claims. (Cl. 260—2)

This invention relates to a new process of polymerizing epoxides and more particularly to an improved process of polymerizing epoxides with an organoaluminum compound.

In accordance with this invention, it has been discovered that greatly improved results are obtained in the polymerization of epoxides when an organoaluminum compounds that has been reacted and/or complexed with a chelating agent within a given molar ratio is used as the catalyst for the polymerization. By using these chelated organoaluminum compounds as catalysts it has been found that much higher molecular weight polyepoxides are generally obtained than when the aluminum compound is not chelated. In many cases, the conversion and/or yield of high molecular weight polymer is greatly increased. Another advantage in the use of these chelated aluminum compounds is in the greatly increased rate of polymerization that may be realized in many cases.

Any epoxide wherein the epoxy group is an oxirane ring may be homopolymerized or copolymerized with a second epoxide by the process of this invention to obtain improved results. Exemplary of the epoxide that may be homopolymerized or copolymerized are the alkylene oxides such as ethylene oxide, propylene oxide, butene oxides, isobutylene epoxide, substituted alkylene oxides such as epichlorohydrin, epibromohydrin, methallyl chloride epoxide, trifluoromethyl ethylene oxide, perfluoropropylene oxide, perfluoroethylene oxide, vinyl chloride epoxide, dichloroisobutylene epoxide, etc., cycloaliphatic epoxides such as cyclohexene oxides, vinyl cyclohexene monoxide, vinyl cyclohexene dioxide, α-pinene epoxide, dipentene epoxide, etc., epoxy ethers such as alkyl glycidyl ethers as, for example, methyl glycidyl ether, ethyl glycidyl ether, isopropyl glycidyl ether, isobutyl glycidyl ether, tert-butyl glycidyl ether, n-hexyl glycidyl ether, n-octyl glycidyl ether, etc., phenyl glycidyl ether, chlorophenyl glycidyl ethers, nitrophenyl glycidyl ethers, alkylphenyl glycidyl ethers, chloroalkyl glycidyl ethers, such as chloroethyl glycidyl ether, unsaturated glycidyl ethers such as vinylglycidyl ether, allyl glycidyl ether, etc., glycidyl esters such as glycidyl acetate, glycidyl propionate, glycidyl pivalate, glycidyl methacrylate, glycidyl acrylate, etc., alkyl glycidates such as methyl glycidate, ethyl glycidate, etc., and other epoxides as, for example, styrene oxide, α-methylstyrene oxide, butadiene monoxide, butadiene dioxide, epoxy stearates, 1-dimethylamino-2,3-epoxy-propane, trimethyl 2,3-epoxypropyl ammonium chloride, etc. Particularly outstanding results are achieved in the polymerization of ethylene oxide and its monosubstituted derivatives such as propylene oxide, epihalohydrins, etc. As pointed out above, any of these epoxides may be homopolymerized or any mixture of two or more may be copolymerized.

Any trihydrocarbonaluminum or dihydrocarbonaluminum hydride or complex thereof may be reacted with the chelating agent to produce the catalysts used in accordance with this invention, the hydrocarbon radical being an alkyl, cycloalkyl or aryl radical. Exemplary of these aluminum compounds are trimethylaluminum, triethylaluminum, tripropylaluminum, triisopropylaluminum, triisobutylaluminum, trihexylaluminum, trioctylaluminum, tricyclohexylaluminum, triphenylaluminum, etc., and the corresponding dihydrocarbonaluminum hydrides such as diethylaluminum hydride, diisobutylaluminum hydride, etc., and their complexes such as the alkali metal aluminum tetraalkyls and alkyl hydrides, as for example, lithium aluminum tetraalkyls, sodium aluminum tetraalkyls, sodium aluminum trialkyl hydride, etc. As pointed out above, these trialkylaluminums and dialkylaluminum hydrides are reacted with a chelating agent, i.e., a compound containing a chelate group, prior to their use as catalysts for the polymerization of epoxides in accordance with this invention. Just why the chelated aluminum alkyls are so effective in producing much higher molecular weight polyepoxides and/or increased yields of polymer is not known. However, it has been found that this result is obtained when a dialkylaluminum hydride or trialkylaluminum is reacted with from about 0.1 to about 2 moles of chelating agent per mole of aluminum, preferably with from about 0.2 to about 1.5 moles and more preferably with about 0.3 to about 1.0 mole per mole of aluminum alkyl. The optimum ratio will, of course, depend on the type of chelating agent, the aluminum alkyl, etc. If more than one chelating group is present in the chelating agent, the amount used will be proportionately lower.

Any organic compound that is capable of forming a ring by co-ordination with its unshared electrons and the aluminum atom may be used. Preferably these chelating agents are characterized by two functional groups, one of which is an —OH group or —SH group, as, for example, a hydroxyl, or an enol of a ketone, sulfoxide or sulfone, an OH of a carboxyl group, etc., which —OH or —SH group interacts with the trialkylaluminum or dialkylaluminum hydride to form a conventional, covalent aluminum-oxygen or aluminum-sulfur bond according to the following equations:

$$R'R_2Al + -OH \rightarrow R_2Al-O- + R'H$$
$$R'R_2Al + -SH \rightarrow R_2Al-S- + R'H$$

where R is alkyl and R' is hydrogen or alkyl. The second functional group is one which contains an oxygen, nitrogen, or sulfur atom that forms a co-ordinate bond with the aluminum. Examples of groups containing such oxygen, nitrogen or sulfur atoms are:

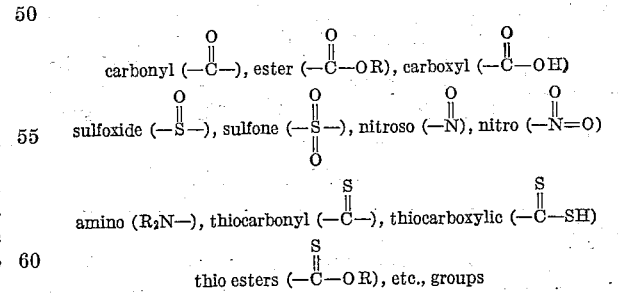

Such chelating agents can thus form from the trialkyl aluminum or dialkylaluminum hydride a cyclic compound of the following structure:

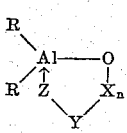

where R is alkyl, Y is carbon, sulfur, or nitrogen and X represents the carbon, nitrogen, and oxygen atoms that may be present between the —YZ group and the —OH group in the chelating agent, $n$ being the number of such atoms. Chelating agents with an —SH group form a cyclic compound of the same type but with S in place of O. In the case of chelating agents containing the group —N=C—SH, the chelate may be a 4 atom cyclic compound. For example, with mercaptobenzothiazole, the chelate is a 4 atom cyclic compound which may have the formula:

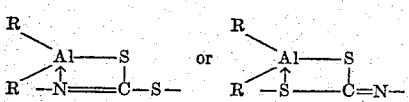

The ring size formed with the aluminum by the chelating agent preferably contains five or six atoms including the aluminum, but rings with four and seven atoms are also operable. Thus, $n$ in the above formula is preferably 2 but may be 0 to 3. The optimum ring size and the preferred chelating agent may vary somewhat with the nature of the substituent groups in the chelating agent as well as with the nature of the epoxide and other factors such as the polymerization diluent and temperature.

Exemplary of the chelating agents that may be reacted with a trialkylaluminum or dialkylaluminum hydride to produce the catalysts of this invention are diketones, such as acetylacetone, trifluoroacetylacetone, acetonylacetone, benzoylacetone, furoylacetone, thenoyltrifluoroacetone, dibenzoyl methane, 3-methyl-2,4-pentane-dione, 3-benzyl-2,4-pentane-dione, etc., ketoacids, such as acetoacetic acid, ketoesters such as ethyl acetoacetate, ketoaldehydes such as formylacetone, hydroxyketones such as hydroxyethyl methyl ketone, hydroxyacetone, o-hydroxyacetophenone, 2,5-dihydroxy-p-benzoquinone, etc., hydroxyaldehydes such as salicylaldehyde, hydroxy esters such as ethyl glycolate, 2-hydroxyethyl acetate, dicarboxylic acids and their esters such as oxalic acid, malonic acid, etc., monoesters of oxalic acid, mono- and diesters of malonic acid, etc., dialdehydes such as malonaldehyde, alkoxyacids such as ethoxyacetic acid, ketoximes such as 2,3-butane-dione-monoxime, dialdehyde monooximes such as glyoxal monoxime, hydroxamic acids such as N-phenyl benzohydroxamic acid, dioximes such as dimethyl glyoxime, nitro compounds such as 1,3-nitroalcohols, 1,3-nitroketones, 2-nitroacetic acid, nitroso compounds such as 1,2-nitroso-oximes, amino alcohols such as ethanolamine, diethylaminoethanol, 8-hydroxyquinoline, 3-diethylaminopropylene oxide, 1,3-imino alcohols such as 3-imino-butanol-1, bis - salicylaldehyde - ethylene diimine (Schiff's bases), 1-3-keto (or aldo-)-imides such as acetylacetone mono-imide, mercaptothiazoles, etc. Chelating agents with two or more chelating functions may also be used, as for example, 2,5-dihydroxy-p-benzoquinone, tetrahydroxyethylethylene diamine, bis(1,3-diketones) such as $(CH_3CO)_2CHCH(COCH_3)_2$, $$(CH_3CO)_2CH(CH_2)_nCH(COCH_3)_2$$

where $n$ is 2, 6, or 10, bis(1,2-ketoximes), bis(1,2-dioximes), etc.

The chelate structures which can exist in two or more similar resonating forms are especially effective, as for example when X has a double bond such as a C=C or C=N group in conjugation with a YZ carbonyl which occurs in the case of 1,3-diketones, 1,2-ketoximes, etc.

Where geometric isomers exist, as for example, $\alpha$ and $\beta$ forms of some ketoximes and syn, anti, and amphi forms of some dioximes, it is generally preferable to use the $\alpha$, anti and amphi forms or conditions where the compound will isomerize to the desired form, since these forms generally yield better chelates.

Any desired procedure may be used for reacting the alkylaluminum compound with the specified molar ratio of chelating agent. It is readily done by adding the specified amount of chelating agent gradually to a solution of the alkylaluminum compound in an inert diluent as, for example, a hydrocarbon diluent such as n-hexane, toluene, or an ether such as diethyl ether, tetrahydrofuran, etc., or a mixture of such diluents. It may also be done in the absence of a diluent. The alkylaluminum chelate may be used immediately after preparation or it may be aged or, if desired, heat-treated in some cases. It is also possible to form the chelate in situ. If desired, the alkylaluminum chelate may be used in combination with other organoaluminum compounds.

Any amount of the alkylaluminum chelate may be used to catalyze the polymerization process in accordance with this invention from a minor catalytic amount up to a large excess but, in general, will be within the range of from about 0.2 to 10 mole percent based on the monomer being polymerized and preferably will be within the range of from about 1 to about 5 mole percent based on the monomer being polymerized. The amount used depends in part on such factors as monomer purity, diluent purity, etc., less pure epoxides and diluents requiring more catalyst to destroy reactive impurities. In order to decrease catalyst consumption, it is generally preferred that impurities such as carbon dioxide, oxygen, aldehydes, alcohols, etc., be kept at as low a level as practical.

The polymerization reaction may be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions may be used as, for example, ethers such as the dialkyl, aryl or cycloalkyl ethers as, for example, diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc., and halogenated hydrocarbons as, for example, chlorobenzene or haloalkanes such as methyl chloride, methylene chloride, chloroform, carbon tetrachloride, ethylene dichloride, etc. Obviously, any mixture of such diluents may be used and in many cases is preferable.

The polymerization process in accordance with this invention may be carried out over a wide range of temperature and pressure. Usually, it will be carried out at a temperature from about —80° C. to about 250° C., preferably from about —80° C. up to about 150° C. and more preferably within the range of about —30° C. to about 100° C. Usually, the polymerization process will be carried out at autogeneous pressure, but superatmospheric pressures up to several hundreds pounds may be used of desired and in the same way, subatmospheric pressures may also be used.

The following examples exemplify the improved results that may be obtained on polymerizing epoxides in accordance with this invention. All parts and percentages are by weight unless otherwise indicated. The molecular weight of the polymers produced in these examples is shown by the reduced specific viscosity (RSV) given for each. By the term "reduced specific viscosity" is meant the $\eta_{sp}/C$ determined on a solution of the polymer in a given diluent. Thus, in the case of the poly(epichlorohydrins) the RSV is determined on a 0.1% solution of the polymer in α-chloronaphthalene dissolved at 100° C. and the viscosity determined at that temperature. The diluent, concentration and temperature at which the RSV is determined are stipulated for each polymer.

EXAMPLES 1 AND 2

Polymerization of Epichlorohydrin

Each of three polymerization vessels free of air were charged under nitrogen with diethyl ether and 10 parts of epichlorohydrin. After equilibrating at 30° C., a solution of the catalyst was injected. The catalyst solutions were prepared by diluting three parts of a solution of triethylaluminum in n-heptane with two parts of ether, one portion of this solution being used as the control, and adding acetylacetone in an amount equal to one mole permole of triethylaluminum in another portion and in an amount equal to two moles per mole of triethylaluminum in another portion and agitating these solutions at 30° C. for 20 hours. The amount of catalyst solution injected into each polymerization vessel was that equivalent to 0.74 part of the triethylaluminum reacted with the acetylacetone. The total amount of diluent present in the system was 17.6 parts of which 12% was n-heptane and 88% was ether. After agitating the polymerization reaction mixtures at 30° C. for 19 hours, the polymerization was stopped by adding 4 parts of anhydrous ethanol. The mixture was then diluted with about 40 parts of diethyl ether, after which the ether-insoluble polymer was collected and washed with ether. It was further purified by slurrying the polymer with a 1% solution of hydrogen chloride in ethanol, again collected, washed with methanol, then with an 0.4% solution of 4,4'-thiobis(6-tert-butyl-m-cresol) in methanol and finally was dried for 16 hours at 50° C. under vacuum. The RSV of each of these polymers was determined on a 0.1% solution in α-chloronaphthalene at 100° C. Tabulated below is the RSV and the amount of polymer expressed as percent of the total polymer along with the control where no chelating agent was used, Example 1 where the triethylaluminum was chelated with a 1:1 mole ratio of acetylacetone (A) and Example 2 with a 2:1 ratio of acetylacetone.

| | Catalyst composition | Ether-insoluble isolated polymer | |
|---|---|---|---|
| | | RSV | Percent of total polymer |
| Control | $(C_2H_5)_3Al$ | 3.9 | 67 |
| Example 1 | $(C_2H_5)_3Al \cdot 1A$ | 6.1 | 45 |
| Example 2 | $(C_2H_5)_3Al \cdot 2A$ | 6.1 | 7.7 |

EXAMPLES 3–23

Polymerization of Ethylene Oxide

In these examples, 10 parts of ethylene oxide was polymerized following the general procedure described above in Examples 1 and 2 except that the diluent was 100% n-heptane and double the amount of diluent was used in Examples 12–18 and 20–21. The catalyst used in Examples 3–16 and 20 was 0.79 part of triisobutylaluminum chelated with various chelating agents, and in Examples 17–19 0.4 part of triisobutylaluminum was chelated. The catalyst used in Example 21 was 0.28 part of diisobutylaluminum hydride chelated with 0.4 mole per mole of aluminum of 2-diethylamino ethanol. The catalyst used in Examples 22 and 23 was 0.46 part of triethylaluminum chelated with various chelating agents in a ratio of 0.5 mole in Example 22 and 0.25 mole in Example 23 of chelating agent per mole of aluminum. The ether-insoluble poly(ethylene oxide) produced in each case was isolated as was the poly(epichlorohydrin) in Examples 1 and 2 except that the hydrogen chloride used in the purification step was dissolved in an 80:20 mixture of ether:methanol instead of ethanol. The RSV of each of the poly(ethyleneoxide)s was determined on a 0.1% solution of the polymer in chloroform at 25° C. In Table I are set forth the reaction time and temperature used in each case, the chelated catalyst expressed as triisobutylaluminum (or triethylaluminum)+mole of chelating agent per mole of aluminum, the RSV of the polymer and amount of the polymer expressed as percent of the total polymer.

TABLE I

| Example | Catalyst | Reaction Time, hrs. | Reaction Temp., °C. | Ether-insoluble polymer isolated RSV | Percent of total polymer |
|---|---|---|---|---|---|
| Control | $(i-C_4H_9)_3Al$ | 19 | 40 | 0.78 | 50 |
| 3 | $(i-C_4H_9)_3Al+0.5$ (2-hydroxyethyl acetate) | 19 | 40 | 2.7 | 50 |
| 4 | $(i-C_4H_9)_3Al+0.5$ (2-ethoxy acetic acid) | 19 | 40 | 2.8 | 19 |
| 5 | $(i-C_4H_9)_3Al+0.5$ hydroxyacetone | 19 | 40 | 3.5 | 57 |
| 6 | $(i-C_4H_9)_3Al+0.5$ salicylaldehyde | 19 | 30 | 2.1 | 33 |
| 7 | $(i-C_4H_9)_3Al+0.5$ hydroxyacetophenone | 19 | 30 | 2.0 | 100 |
| 8 | $(i-C_4H_9)_3Al+1.0$ salicylaldehyde | 43 | 30 | 3.9 | 50 |
| 9 | $(i-C_4H_9)_3Al+1.0$ hydroxyacetophenone | 43 | 30 | 8.0 | 23 |
| 10 | $(i-C_4H_9)_3Al+1.0$ ethyl acetoacetate | 43 | 30 | 6.3 | 50 |
| 11 | $(i-C_4H_9)_3Al+1.0$ acetylacetone | 48 | 30 | 8.3 | 56 |
| 12 | $(i-C_4H_9)_3Al+0.5$ diethyl malonate | 19 | 30 | 5.1 | 64 |
| 13 | $(i-C_4H_9)_3Al+0.5$ phenyl glyoxaldoxime | 19 | 30 | 3.6 | 100 |
| 14 | $(i-C_4H_9)_3Al+0.5$ N-phenylbenzohydroxamic acid | 19 | 30 | 1.4 | 95 |
| 15 | $(i-C_4H_9)_3Al+0.5$ acetylacetone imide | 19 | 30 | 1.1 | 98 |
| 16 | $(i-C_4H_9)_3Al+0.5$ dimethyl glyoxime | 19 | 30 | 2.3 | 100 |
| 17 | $(i-C_4H_9)_3Al+0.4$ (8-hydroxyquinoline) | 19 | 30 | 1.8 | 100 |
| 18 | $(i-C_4H_9)_3Al+0.5$ mercaptobenzothiazole | 2.8 | 30 | 0.5 | 94 |
| 19 | $(i-C_4H_9)_3Al+0.5$ (3-diethylaminopropanol-1) | 22 | 30 | 0.5 | 100 |
| 20 | $(i-C_4H_9)_3Al+0.1$ tetrahydroxyethyl ethylene diamine | 19 | 30 | 0.6 | 100 |
| 21 | $(i-C_4H_9)_2AlH+0.4$ (2-diethylamino ethanol) | 19 | 30 | 0.6 | 100 |
| Control | $(C_2H_5)_3Al$ | 19 | 30 | 0.5 | 38 |
| 22 | $(C_2H_5)_3Al+0.5$ (2,3-butanedione-2 oxime) | 19 | 30 | 15 | 100 |
| 23 | $(C_2H_5)_3Al+0.25$ oxalic acid | 19 | 30 | 2.6 | 31 |

EXAMPLE 24

Ten parts of propylene oxide was polymerized by the polymerization procedure described in Examples 1 and 2 using as diluent a mixture of ether and n-heptane as there and as catalyst 0.46 part of triethylaluminum chelated with 1 mole of acetylacetone per mole of aluminum in comparison with a control where 0.46 part of triethylaluminum and no chelating agent was used. After 19 hours at 30° C., the polymerization was stopped. The poly(propylene oxide) produced was ether-soluble and was isolated by adding sufficient ether to make the solution of low viscosity for ease in handling, then washing the reaction mixture first with a 3% aqueous solution of hydrogen chloride, then with water until neutral, then with a 2% aqueous solution of sodium bicarbonate and again with water. After adding Santonox, i.e., 4,4'-thiobis(6-tert-butyl-m-cresol), equal to 0.5% based on the polymer to the reaction mixture, the ether was evaporated and the polymer was dried. The RSV's were determined on a 0.1% solution in benzene at 25° C. The polymer produced in the control, i.e., triethylaluminum with no chelating agent, had an RSV of 0.19 and amounted to 87% of the total polymer whereas that produced with the triethylaluminum-acetyl-acetone chelate had an RSV of 14.8 and amounted to 70% of the total polymer produced.

EXAMPLES 25-29

Polymerization of Propylene Oxide

Ten parts of propylene oxide was polymerized in these examples with various chelates of riisobutylaluminum by the same procedure described in Examples 3-11 using n-heptane as the sole diluent. In Examples 25-28, the triisobutylaluminum was reacted with 0.5 mole of the chelating agent per mole of aluminum and in Example 29 with 1.0 mole per mole of aluminum. The polymers produced in each case were isolated as described in Example 24. The reaction time and temperature used in each case are set forth in Table II along with the chelated catalyst expressed as triisobutylaluminum+mole of chelating agent per mole of aluminum, the RSV of the polymer (0.1% solution in benzene at 25° C.) and the amount of the polymer expressed as percent of the total polymer.

EXAMPLE 30

Example 29 was repeated for the polymerization of propylene oxide except that the catalyst used was the chelate formed by reacting 0.57 part of diisobutylaluminum hydride with acetylacetone in an amount of equal to 1.0 mole per mole of aluminum. The poly(propylene oxide) so produced had an RSV of 15 and amounted to 90% of the total polymer produced.

EXAMPLES 31-36

Epichlorohydrin (10 parts) was polymerized as described in Examples 1 and 2 except that n-heptane (20.5 parts) was used as the diluent and the catalyst was triisobutylaluminum (0.79 part) chelated with 0.5 mole per mole of aluminum of various chelating agents. The polymerization was carried out at 30° C. in Example 31 and at 65° C. in Examples 32-36. The polymer was isolated and purified as described in Examples 1 and 2. In Table III are set forth the reaction time and temperature, the chelated catalyst expressed as triisobutylaluminum+mole of chelating agent per mole of aluminum, the RSV, and amount of the ether-insoluble polymer produced.

TABLE III

| Example | Catalyst | Reaction | | Total percent conversion | Ether-insoluble polymer isolated | |
| | | Time, hrs. | Temp., °C. | | RSV | Percent of total polymer |
|---|---|---|---|---|---|---|
| Control | (i-C$_4$H$_9$)$_3$Al | 19 | 30 | 50 | 0.12 | 70 |
| 31 | (i-C$_4$H$_9$)$_3$Al+0.5 (2,3-butane-dione-2-oxime) | 19 | 30 | 25 | 6.7 | 72 |
| Control | (i-C$_4$H$_9$)$_3$Al | 19 | 65 | 62 | 0.5 | 6 |
| 32 | (i-C$_4$H$_9$)$_3$Al+0.5 diethyl malonate | 19 | 65 | 18 | 0.6 | 21 |
| 33 | (i-C$_4$H$_9$)$_3$Al+0.5 dimethy glyoxime | 19 | 65 | 30 | 4.9 | 70 |
| 34 | (i-C$_4$H$_9$)$_3$Al+0.5 phenyl glyoxaldoxime | 19 | 65 | 87 | 3.4 | 86 |
| 35 | (i-C$_4$H$_9$)$_3$Al+0.5 N-phenylbenzo-hydroxamic acid | 19 | 65 | 25 | 2.8 | 28 |
| 36 | (i-C$_4$H$_9$)$_3$Al+0.5 (5-methyl-1,2,3,-cyclohexane-thione-1,3-dioxime) | 19 | 65 | 84 | 3.8 | 91 |

TABLE II

| Example | Catalyst | Reaction | | Ether-insoluble polymer isolated | |
| | | Time, hrs. | Temp., °C. | RSV | Percent of total polymer |
|---|---|---|---|---|---|
| Control | (i-C$_4$H$_9$)$_3$Al | 19 | 65 | 1.6 | 90 |
| 25 | (i-C$_4$H$_9$)$_3$Al+0.5 (2-ethoxy-acetic acid) | 19 | 65 | 2.0 | 80 |
| 26 | (i-C$_4$H$_9$)$_3$Al+0.5 hydroxyacetone | 19 | 65 | 2.1 | 77 |
| 27 | (i-C$_4$H$_9$)$_3$Al+0.5 ethyl glycolate | 19 | 65 | 2.7 | 80 |
| 28 | (i-C$_4$H$_9$)$_3$Al+0.5 acetylacetone | 48 | 30 | 5.0 | 95 |
| 29 | (i-C$_4$H$_9$)$_3$Al+1.0 acetylacetone | 48 | 65 | 17.2 | 86 |

EXAMPLES 37-46

Epichlorohydrin was polymerized as described in Examples 1-2 and 31-36 except that 23 parts of n-heptane was used as the diluent and the catalyst level was half of that used in those examples, i.e. 0.4 part of triisobutylaluminum chelated with various chelating agents in varying amount per mole of aluminum. In Examples 37-39, 41-44 and 46 the chelated catalyst was aged for 1 hour at 30° C. before using and in Example 45 for 20 hours and in Example 40 the chelate was aged for 2 days. In Table IV are set forth the reaction time and temperature, the chelated catalyst expressed as triisobutylaluminum+mole of chelating agent per mole of aluminum, the RSV and amount of the ether-insoluble polymer produced.

TABLE IV

| Example | Catalyst | Reaction | | Total percent conversion | Ether-insoluble polymer isolated | |
| | | Time, hrs. | Temp., °C. | | RSV | Percent of total polymer |
|---|---|---|---|---|---|---|
| Control | (i-C$_4$H$_9$)$_3$Al | 19 | 30 | 47 | 0.15 | 83 |
| 37 | (i-C$_4$H$_9$)$_3$Al+0.1 (3-diethylamino-1-propanol) | 19 | 30 | 78 | 0.66 | 99 |
| 38 | (i-C$_4$H$_9$)$_3$Al+0.2 (3-diethylamino-1-propanol) | 19 | 30 | 83 | 0.79 | 99 |
| 39 | (i-C$_4$H$_9$)$_3$Al+0.4 (3-diethylamino-1-propanol) | 19 | 30 | 86 | 0.9 | 100 |
| 40 | (i-C$_4$H$_9$)$_3$Al+0.4 (aged 2 days) | 19 | 30 | 73 | 3.6 | 100 |
| 41 | (i-C$_4$H$_9$)$_3$Al+0.4 (3-di-n-butylamine-1-propanol) | 19 | 30 | 88 | 1.01 | 100 |
| 42 | (i-C$_4$H$_9$)$_3$Al+0.4 (2-dimethylamino-ethanol) | 19 | 30 | 88 | 0.95 | 100 |
| 43 | (i-C$_4$H$_9$)$_3$Al+0.4 (2-diethylamino-ethanol) | 19 | 30 | 84 | 1.35 | 100 |
| 44 | (i-C$_4$H$_9$)$_3$Al+0.4 m-diethylaminophenol | 19 | 30 | 81 | 0.49 | 100 |
| 45 | (i-C$_4$H$_9$)$_3$Al+0.1 tetrahydroxyethyl ethylene diamine (aged 20 hours) | 19 | 30 | 22 | 1.2 | 30 |
| 46 | (i-C$_4$H$_9$)$_3$Al+0.4 ethanolamine | 19 | 30 | 10 | 0.31 | 60 |

EXAMPLE 47

In this example ethylene oxide and epichlorohydrin were copolymerized. Each of two polymerization vessels free of air were charged under nitrogen with 40 parts of toluene, 5 parts of ethylene oxide and 5 parts of epichlorohydrin. After equilibrating at 30° C., a solution of the catalyst was injected. The catalyst used in the control was 0.4 part of triisobutylaluminum and in Example 47 the catalyst was 0.4 part of triisobutylaluminum chelated with 0.5 mole of dimethyl glyoxime per mole of aluminum. After agitating the polymerization reaction mixtures at 30° C. for 5 hours, the polymerization was stopped by adding 4 parts of anhydrous ethanol. The copolymer was isolated in each case by adding the reaction mixture to 4 volumes of n-heptane, separating the copolymer by filtration, washing twice with n-heptane, then with an 0.1% solution of 4,4'-thiobis(6-tert-butyl-m-cresol) in n-heptane and drying.

In the example using the chelated triisobutylaluminum catalyst the isolated copolymer was 100% of the total polymer and it was a tough, snappy rubber. In the control, the isolated copolymer amounted to only 35% of the total polymer and it was a rubbery solid of obviously much lower molecular weight.

The foregoing examples clearly demonstrate the many advantages that may be achieved when a chelated alkyl-aluminum compound is used as the catalyst for the polymerization of epoxides. In the majority of cases there is a large increase in molecular weight, as shown by the increased RSV of the polymer which may also be accompanied with an increase in the yield of the desired polymer. In other cases, the molecular weight of the polymer may not be much different, but there is a great increase in yield of polymer and/or rate of the polymerization reaction. Obviously, many variations may be made in the process of this invention.

This application is a continuation-in-part of my U.S. patent application Serial No. 738,632, filed May 29, 1958, now abandoned.

What I claim and desire to protect by Letters Patent is:

1. The process of preparing poly(epoxide)s which comprises polymerizing epoxides, wherein the epoxy group is an oxirane group, by contacting at least one of said epoxides with, as a catalyst, a chelated organoaluminum compound containing at least one aluminum-to-carbon bond, formed by chelating, under essentially anhydrous conditions, an organoaluminum compound with a chelating agent in an amount such that the molar ratio of chelating agent to organoaluminum compound is within the range of from about 0.1 to about 2, said organoaluminum compound being selected from the group consisting of trialkylaluminum compounds and dialkylaluminum hydrides, wherein the alkyl group contains from 1 to 8 carbon atoms, said epoxide being free of groups other than oxirane groups which are reactive with said organoaluminum catalyst, and said chelating agent is selected from the group consisting of polyketones, ketomonocarboxylic acids and esters thereof, ketoaldehydes, hydroxyketones, hydroxyaldehydes, hydroxymonocarboxylic acid esters, hydroxyalkyl monocarboxylates, dicarboxylic acids and esters thereof, dialdehydes, alkoxymonocarboxylic acids, ketooximes, aldooximes, hydroxamic acids, dioximes, amino alcohols, amino alcohols, ketoimides, aldoimides, and mercaptothiazoles.

2. The process of claim 1 wherein the organoaluminum compound is a trialkylaluminum.

3. The process of claim 1 wherein the organoaluminum compound is a dialkylaluminum hydride.

4. The process of claim 2 wherein the chelating agent is acetylacetone.

5. The process of claim 4 wherein from about 0.3 to about 1 mole of acetylacetone is reacted with the trialkylaluminum.

6. The process of claim 2 wherein the chelating agent is dimethyl glyoxime.

7. The process of claim 6 wherein from about 0.3 to about 1 mole of dimethyl glyoxime is reacted with the trialkylaluminum.

8. The process of claim 2 wherein the chelating agent is phenyl glyoxaldoxime.

9. The process of claim 8 wherein from about 0.3 to about 1 mole of phenyl glyoxaldoxime is reacted with the trialkylaluminum.

10. The process of claim 5 wherein the epoxide that is polymerized is epichlorohydrin.

11. The process of claim 6 wherein the epoxide is ethylene oxide.

12. The process of claim 6 wherein the epoxide is epichlorohydrin.

13. The process of claim 8 wherein the epoxide is ethylene oxide.

14. The process of claim 8 wherein the epoxide is epichlorohydrin.

References Cited in the file of this patent

UNITED STATES PATENTS

| | | |
|---|---|---|
| 2,699,457 | Ziegler et al. | Jan. 11, 1955 |
| 2,801,228 | Starck et al. | July 30, 1957 |
| 2,866,761 | Hill et al. | Dec. 30, 1958 |
| 2,870,100 | Stewart et al. | Jan. 20, 1959 |

UNITED STATES PATENT OFFICE
CERTIFICATE OF CORRECTION

Patent No. 3,135,706 June 2, 1964

Edwin J. Vandenberg

It is hereby certified that error appears in the above numbered patent requiring correction and that the said Letters Patent should read as corrected below.

Column 4, line 69, for "of" read -- if --; column 7, line 11, for "riisobutylaluminum" read -- triisobutylaluminum --; same column 7, TABLE II, under the heading "Temp., ° C.", last line thereof, for "65" read -- 30 --; column 8, TABLE III, Example 33, under the heading "Catalyst", for "dimethy" read -- dimethyl --; column 10, line 13, for "amino", second occurrence, read -- imino --.

Signed and sealed this 29th day of September 1964.

(SEAL)
Attest:

ERNEST W. SWIDER
Attesting Officer

EDWARD J. BRENNER
Commissioner of Patents